United States Patent
Bickham et al.

(10) Patent No.: US 12,164,143 B2
(45) Date of Patent: Dec. 10, 2024

(54) OPTICAL FIBERS FOR SINGLE MODE AND FEW MODE VCSEL-BASED OPTICAL FIBER TRANSMISSION SYSTEMS

(71) Applicant: CORNING INCORPORATED, Corning, NY (US)

(72) Inventors: Scott Robertson Bickham, Corning, NY (US); Xin Chen, Painted Post, NY (US); Kangmei Li, San Jose, CA (US); Ming-Jun Li, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/903,319

(22) Filed: Sep. 6, 2022

(65) Prior Publication Data
US 2023/0305221 A1  Sep. 28, 2023

Related U.S. Application Data

(60) Provisional application No. 63/242,210, filed on Sep. 9, 2021.

(51) Int. Cl.
*G02B 6/02* (2006.01)
*G02B 6/028* (2006.01)
*G02B 6/036* (2006.01)

(52) U.S. Cl.
CPC ....... *G02B 6/02004* (2013.01); *G02B 6/0281* (2013.01); *G02B 6/0365* (2013.01)

(58) Field of Classification Search
None
See application file for complete search history.

(56) References Cited

U.S. PATENT DOCUMENTS

| | | |
|---|---|---|
| 4,204,745 A | 5/1980 | Kimura et al. |
| 6,885,802 B2 | 4/2005 | Oliveti et al. |
| 7,336,877 B2 | 2/2008 | Bickham |

(Continued)

FOREIGN PATENT DOCUMENTS

EP  3865920 A1  8/2021

OTHER PUBLICATIONS

International Search Report and Written Opinion of the International Searching Authority; PCT/US22/40696; mailed on Jan. 2, 2023, 16 pages; European Patent Office.

(Continued)

*Primary Examiner* — Chris H Chu
(74) *Attorney, Agent, or Firm* — Yiqun Zhao

(57) ABSTRACT

The optical fibers disclosed have single mode and few mode optical transmission for VCSEL-based optical fiber transmission systems. The optical fibers have a cable cutoff wavelength $\lambda_C$ of equal to or below 1260 nm thereby defining single mode operation at a wavelength in a first wavelength range greater than 1260 nm and few-mode operation at a wavelength in a second wavelength range from 970 nm and 1070 nm. The mode-field diameter is in the range from 9.3 microns to 10.9 microns at 1550 nm. The optical fibers have an overfilled bandwidth OFL BW of 1 GHz·km to 3 GHz·km at the at least one wavelength in the second wavelength range. VCSEL based optical transmission systems and methods are disclosed that utilize both single core and multicore versions of the optical fiber.

7 Claims, 9 Drawing Sheets

(56) References Cited

U.S. PATENT DOCUMENTS

| | | |
|---|---|---|
| 7,406,237 B2 | 7/2008 | Bickham et al. |
| 8,588,569 B2 | 11/2013 | Bookbinder et al. |
| 8,666,214 B2 | 3/2014 | Bookbinder et al. |
| 8,891,925 B2 | 11/2014 | Bickham et al. |
| 11,012,154 B2 | 5/2021 | Chen et al. |
| 11,099,321 B2 | 8/2021 | Chen et al. |
| 11,287,567 B2 | 3/2022 | Bickham et al. |
| 11,467,335 B2 | 10/2022 | Chen et al. |
| 2019/0361170 A1 | 11/2019 | Bickham et al. |
| 2020/0257040 A1* | 8/2020 | Chen ............... G02B 6/42 |
| 2021/0032153 A1 | 2/2021 | Chen et al. |
| 2021/0033780 A1* | 2/2021 | Malaviya ......... G02B 6/03694 |
| 2021/0247566 A1* | 8/2021 | Malviya ........... G02B 6/02395 |

OTHER PUBLICATIONS

Kao et al., "Comparison of single-/few-/multi-mode 850 nm VCSELs for optical OFDM transmission", Optics Express, vol. 25, No. 14, Jul. 10, 2017, 17 Pages.

Li, et al., "High Data Rate Few-Mode Transmission over Graded-index Single-Mode Fiber using 850 nm Single-Mode VCSEL", Opt. Express, 27, 2019, pp. 21395-21404.

* cited by examiner

OPTICAL FIBERS FOR SINGLE MODE AND FEW MODE VCSEL-BASED OPTICAL FIBER TRANSMISSION SYSTEMS

This application claims the benefit of priority under 35 U.S.C. § 119 of U.S. Provisional Application Ser. No. 63/242,210 filed on Sep. 9, 2021, the content of which is relied upon and incorporated herein by reference in its entirety.

FIELD

Background

The present disclosure relates to optical fibers and in particular relates to optical fibers for single mode and few mode VCSEL-based optical fiber transmission systems.

Standard single mode (SM) fiber is the preferred optical fiber for use in hyperscale data centers because it has more bandwidth than multimode (MM) fibers, thereby providing higher data rates and longer distance data transmission. On the other hand, hyperscale data centers also utilize relatively short data links, e.g., from 1 meter to 100 meters. In this distance range, MM fiber systems with MM VCSEL transceivers offer lower cost solutions with lower power consumption. In practice, hyperscale data centers use standard SM fiber for both long and short data links to simplify the fiber cable management. In other words, the cost savings and operational benefits associated with using MM fiber for the short data links does not outweigh the additional costs and complexity associated with the fiber cable management issues of dealing with two different types of fiber cables.

The fiber cable management issues can be avoided if low-cost optical transmission can be performed over the SM fiber for the short distance links. VCSELs that emit SM or few mode (FM) light offer the promise of better system performance than MM VCSELs. The SM or FM VCSELs are made using a platform and process similar to that used to form MM VCSELs so that their respective costs are about the same. On the other hand, the lower numerical aperture (NA) and smaller spot size of the light emission from SM and FM VCSELs make them more suitable for launching into smaller core optical fibers, i.e., SM fibers.

In recent years, the design and the technology of making SM VCSELs have reached the level that SM VCSELs can also have similar optical power to MM VCSELs.

VCSELs for optical fiber data transmission typically operate at 850 nm, but VCSELs can be made to operate within a wavelength range between 850 nm and 1060 nm. In this wavelength range, a standard SM fiber designed for SM operation at wavelengths above 1300 nm can support a few modes. A SM or FM VCSEL can couple to such a fiber with relatively low insertion loss. However, the bandwidth of standard SM fibers within the 850 nm to 1060 nm wavelength range is too low to be suitable for high data rate transmission. To enable the SM or FM VCSEL transmission over a SM fiber, a SM fiber with bandwidth optimized for use in the wavelength range of 850 nm to 1060 nm is needed.

SUMMARY

A SM fiber is disclosed that meets the requirements of the cable cutoff wavelength c and the mode field diameter MFD of standard SM fiber while having optimal bandwidth for SM or FM VCSEL transmission in a wavelength range between 850 nm and 1060 nm. Single-core and multicore embodiments of the SM fiber are disclosed. The SM fibers disclosed herein have dual use, namely they operate as a true SM fiber (i.e., like a standard SM fiber) at wavelengths above 1260 nm while operating as a few-mode fiber at the at least one wavelength in the range of 850 nm to 1100 nm and with a high modal bandwidth. The improved high modal bandwidth is achieved by using a graded index profile in the core region. The single-core and multicore SM fibers disclosed herein enable a cost effective and power efficient transmission for short reach optical fiber links.

The SM fibers disclosed herein are compatible with existing standard SM fiber and can also be used for long-distance transmission. The SM fibers can be made using standard optical fiber drawing techniques and is anticipated to have substantially the same fabrication cost.

A first embodiment of the disclosure is an optical fiber for short-length data transmission systems, wherein the optical fiber includes: a) a core arranged along a centerline $\lambda_C$ and having a relative refractive index defined by an alpha parameter a≥3 with a maximum relative refractive index $\Delta_{1max}$ in the range $0.3\% \leq \Delta_{1max} \leq 0.5\%$ and a radius $r_1$ in the range 4.6 µm≤$r_1$≤5.6 µm; b) a first inner cladding region immediately surrounding the core and having a relative refractive index $\Delta_2$ in the range $-0.002 \leq \Delta_2 \leq 0.002$ and a radius $r_2$ in the range from 10 µm≤$r_2$≤12 µm; c) an second inner cladding region immediately surrounding the first inner cladding region and having a relative refractive index $\Delta_3 \leq \Delta_2$ and in the range $-0.7\% \leq \Delta_3 \leq -0.1\%$ and a radius $r_3$ in the range from 12 µm≤$r_3$≤18 µm; d) an outer cladding region immediately surrounding the second inner cladding region and having a relative refractive index $\Delta_4 \geq \Delta_3$ and in the range $0 \leq \Delta_4 \leq 0.04\%$ and a radius $r_4$ in the range from 40 µm≤$r_4$≤62.5 µm; and i) a cable cutoff wavelength $\lambda_C$ of equal to or below 1260 nm thereby defining single mode operation at a wavelength in a first wavelength range greater than 1260 nm and few-mode operation at a wavelength in a second wavelength range from 970 nm and 1070 nm; ii) a mode-field diameter MFD in the range from 9.3 µm≤MFD≤10.9 µm at 1550 nm; and iii) an overfilled bandwidth OFL BW of 1 GHz·km to 3 GHz·km at at least one wavelength in the second wavelength range.

A second embodiment of the disclosure is directed to the optical fiber according to the first embodiment, wherein the core has a relative refractive index defined by an alpha parameter 3.5≤a≤15.

A third embodiment of the disclosure is directed to the optical fiber according to the first embodiment, wherein the core has a relative refractive index defined by an alpha parameter 3.5≤a≤5.5.

A fourth embodiment of the disclosure is directed to the optical fiber according to the first embodiment, wherein the maximum relative refractive index $\Delta_{1max}$ of the core is in the range 0.34%≤$\Delta_{1max}$≤0.37%.

A fifth embodiment of the disclosure is directed to the optical fiber according to the first embodiment, wherein the relative refractive index $\Delta_2$ in the range −0.02%≤$\Delta_2$≤0.02%.

A sixth embodiment of the disclosure is directed to the optical fiber according to the first embodiment, wherein the mode field diameter MFD is in the range from 8.2 µm≤MFD≤9.7 µm at 1310 nm.

A seventh embodiment of the disclosure is directed to the optical fiber according to the first embodiment, wherein a zero-dispersion wavelength $\lambda_0$ is in the range from 1300≤$\lambda_0$≤1324.

An eighth embodiment of the disclosure is directed to the optical fiber according to the first embodiment, wherein a dispersion at 1550 nm is in the range from 16.5 ps/nm·km to 18 ps/nm·km.

A ninth embodiment of the disclosure is directed to an optical fiber data transmission system including: an optical fiber link comprising the optical fiber of embodiment 1, wherein the optical fiber link has an input end, an output end and a link length LL between the input and output ends, wherein LL<2000 meters; a transmitter comprising a VCSEL that emits light having a wavelength in the second wavelength range and that carries optical signals at a data rate of at least 10 Gb/s, wherein the VCSEL is optically coupled to the input end of the optical fiber link; and a receiver comprising a photodetector optically coupled to the output end of the optical fiber link and configured to receive the optical signals and convert the optical signals to electrical signals.

A tenth embodiment of the disclosure is directed to the optical fiber data transmission system according to the ninth embodiment, wherein the mode field diameter MFD is in the range from 8.2 μm≤MFD≤9.7 μm at 1310 nm.

An eleventh embodiment of the disclosure is directed to the optical fiber data transmission system according to the ninth embodiment, wherein a zero-dispersion wavelength $\lambda_0$ is in the range from 1300≤$\lambda_0$≤1324.

A twelfth embodiment of the disclosure is directed to the optical fiber data transmission system according to the ninth embodiment, wherein a dispersion at 1550 nm is in the range from 16.5 ps/nm·km to 18 ps/nm·km.

A thirteenth embodiment of the disclosure is directed to an optical fiber for short-length data transmission systems, wherein the optical fiber includes: a) a core arranged along a centerline AC and having a relative refractive index defined by an alpha parameter a in a range 3.5≤a15 with a maximum relative refractive index $\lambda_{1max}$ in the range 0.34%≤$\Delta_{1max}$≤0.37% and a radius $r_1$ in the range 4.6 μm≤$r_1$≤5 μm; b) an inner cladding region immediately surrounding the core and having a relative refractive index $\Delta_2$ in the range −0.02%≤$\Delta_2$≤0.02% and a radius $r_2$ in the range from 10 μm≤$r_2$≤62.5 μm; and i) a cable cutoff wavelength $\lambda_C$ of equal to or below 1260 nm thereby defining single mode operation at a wavelength in a first wavelength range greater than 1260 nm and few-mode operation at a wavelength in a second wavelength range from 970 nm and 1070 nm; ii) a mode-field diameter MFD in the range from 10.2 μm≤MFD≤10.9 μm at 1550 nm; and iii) an overfilled bandwidth OFL BW of 1 GHz·km to 3 GHz·km at at least one wavelength in the second wavelength range.

A fourteenth embodiment of the disclosure is directed to the optical fiber data transmission system according to the thirteenth embodiment, wherein the mode field diameter MFD is in the range from 8.2 μm≤MFD≤9.7 μm at 1310 nm.

A fifteenth embodiment of the disclosure is directed to the optical fiber data transmission system according to the thirteenth embodiment, wherein a zero-dispersion wavelength λ0 is in the range from 1300≤λ0≤1324.

A sixteenth embodiment of the disclosure is directed to the optical fiber data transmission system according to the thirteenth embodiment, wherein a dispersion at 1550 nm is in the range from 16.5 ps/nm·km to 17.5 ps/nm·km.

A seventeenth embodiment of the disclosure is directed to an optical fiber data transmission system including: an optical fiber link comprising the optical fiber according to the ninth embodiment, wherein the optical fiber link has an input end, an output end and a link length LL between the input and output ends, wherein LL<2000 meters; a transmitter comprising a VCSEL that emits light having a wavelength in the second wavelength range and that carries optical signals at a data rate of at least 10 Gb/s, wherein the VCSEL is optically coupled to the input end of the optical fiber link; and a receiver comprising a photodetector optically coupled to the output end of the optical fiber link and configured to receive the optical signals and convert the optical signals to electrical signals.

A eighteenth embodiment of the disclosure is an optical fiber for short-length data transmission systems, wherein the optical fiber includes: a silica based core region comprising an outer radius $r_1$ in the range from 3.6 to 5.0 microns, a maximum relative refractive index $\Delta_{1MAX}$ in the range from 0.25 to 0.4%, a core alpha in the range from 3.5 to 5.5, and a core volume in the range from 3.5%-sq. microns to 5.0%-sq. microns; a depressed index cladding region surrounding said core region, said depressed index cladding region comprising an inner radius $r_2$ such that $r_1/r_2$ is greater than 0.45 and less than 0.65, an outer radius $r_3$ and a minimum relative refractive index $\Delta_{3MIN}$ in the range from less than −0.2% to greater than −0.4%, and a trench volume in the range from greater than or equal 20% $\mu m^2$ to less than or equal to 50% $\mu m^2$; an outer cladding region surrounding said depressed index cladding region, said outer cladding region comprising an outer radius $r_4$; and wherein said optical fiber has: a mode field diameter (MFD) at 1310 nm such that 9.5 microns≥MFD≥8.6 microns; a cable cutoff wavelength 1060 nm; a fiber cutoff wavelength less than 1200 nm, a bending loss BL at 1310 nm, as determined by the mandrel wrap test using a mandrel comprising a diameter of 15 mm, less than 1.0 dB/turn; a zero dispersion wavelength ($\lambda_0$) in the range from 1300 nm to 1324 nm; and an overfilled bandwidth at 850 nm greater than 1.0 GHz·km.

A nineteenth embodiment of the disclosure is directed to the optical fiber according to the eighteenth embodiment, wherein the trench volume of the depressed index cladding region is greater than or equal to 30% $\mu m^2$ and less than or equal to 50% $\mu m^2$.

A twentieth embodiment of the disclosure is directed to the optical fiber according to the eighteenth embodiment, wherein the trench volume of the depressed index cladding region is greater than or equal to 40% $\mu m^2$ and less than or equal to 50% $\mu m^2$.

A twenty-first embodiment of the disclosure is directed to the optical fiber according to the eighteenth embodiment, wherein the overfilled bandwidth at 850 nm is 1 GHz·km to 3 GHz·km Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which.

DETAILED DESCRIPTION

Figure 1A:
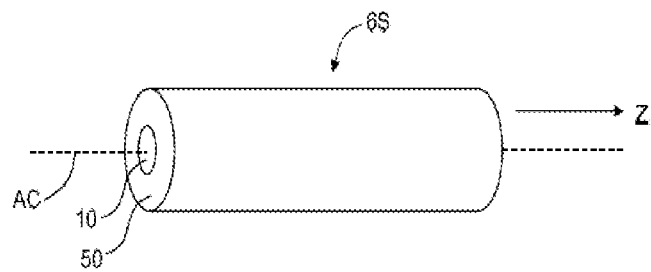
FIG. 1A is a side elevated view of a section of the single-core optical fiber as disclosed herein and having enhanced optical performance for short-distance data communication links that utilize VCSELs.

Reference is made in detail to example embodiments illustrated in the accompanying drawings. Whenever possible, the same reference numerals are used throughout the drawings to refer to the same or like parts.

The claims as set forth below are incorporated into and constitute part of this Detailed Description.

Cartesian coordinates are used in some of the Figures for the sake of reference and ease of illustration and are not intended to be limiting as to direction or orientation. The z-direction is taken as the axial direction of the optical fiber.

The acronym VCSEL stands for "vertical cavity surface emitting laser."

The term "fiber" as used herein is shorthand for optical fiber.

The coordinate r is a radial coordinate, where r=0 corresponds to the centerline of the fiber.

The symbol "μm" is used as shorthand for "micron," which is a micrometer, i.e., 1×10−6 meter.

The symbol "nm" is used as shorthand for "nanometer," which is 1×10$^{-9}$ meter.

The limits on any ranges cited herein are inclusive and thus to lie within the range, unless otherwise specified.

The terms "comprising," and "comprises," e.g., "A comprises B," is intended to include as a special case the concept of "consisting," as in "A consists of B."

The phrase "bare optical fiber" or "bare fiber" as used herein means an optical fiber directly drawn from a heated glass source (i.e., a "preform") and prior to applying a protective coating layer to its outer surface (e.g., prior to the bare optical fiber being coated with a polymeric-based material).

The "relative refractive index" as used herein is defined as:

$$\Delta \% = 100 \frac{n^2(r) - n_{cl}^2}{2n^2(r)}$$

where n(r) is the refractive index of the fiber at the radial distance r from the fiber's centreline AC (r=0) at a wavelength of 1550 nm, unless otherwise specified, and $n_{c1}$ is the index of the outer cladding at a wavelength of 1550 nm. When the outer cladding is essentially pure silica, $n_{c1}$=1.444 at a wavelength of 1550 nm. As used herein, the relative refractive index percent (also referred herein as the "relative refractive index" for short) is represented by Δ (or "delta"), Δ % (or "delta %"), or %, all of which can be used interchangeably, and its values are given in units of percent or %, unless otherwise specified. Relative refractive index is also expressed as Δ(r) or Δ(r) %.

In cases where the refractive index of a region is less than the reference index $n_{c1}$, the relative index percent is negative and is referred to as having a depressed region or depressed-index (also referred to as a "trench"), and the minimum relative refractive index is calculated at the point at which the relative index is most negative unless otherwise specified. In cases where the refractive index of a region is greater than the reference index $n_{c1}$, the relative index percent is positive and the region can be said to be raised or to have a positive index.

The term "dopant" as used herein refers to a substance that changes the relative refractive index of glass relative to pure undoped $SiO_2$. One or more other substances that are not dopants may be present in a region of an optical fiber (e.g., the core) having a positive relative refractive index Δ. The dopants used to form the core of the optical fiber disclosed herein include $GeO_2$ (germania) and $Al_2O_3$ (alumina). The parameter a (also called the "profile parameter" or "alpha parameter") as used herein relates to the relative refractive Δ(%) where r is the radius (radial coordinate), and which is defined by:

$$\Delta(r) = \Delta_0 \{1 - [(r-r_m)/(r_0-r_m)]^a\}$$

where $r_m$ is the point where Δ(r) is the maximum $\Delta_0$, $r_0$ is the point at which Δ(r)=0 and r is in the range $r_i$ to $r_f$, where Δ(r) is defined above, $r_i$ is the initial point of the a-profile, $r_f$ is the final point of the a-profile and a is an exponent that is a real number. For a step index relative refractive profile, a>10, and for a gradient relative refractive index profile, a<5.

The "trench volume" is denoted by V and is defined for a trench with a relative refractive index $\Delta_3$ as a constant $\Delta_{3min}$:

$$V = \Delta_{3min} \cdot [(r_3)^2 - (r_2)^2].$$

In an example where the relative refractive index $\Delta_3$ varies with radial coordinate (i.e., $\Delta_3(r)$), then the moat or trench volume is given by $$V = 2\int \Delta_3(r) r\, dr$$

with the limits on the integration being from $r_2$ to $r_3$ and the units are in %-μm$^2$. The symbol |V| is used to denote the absolute value of the trench volume.

The "mode field diameter" or "MFD" of an optical fiber is determined using the Peterman II method, which is the current international standard measurement technique for measuring the MFD of an optical fiber. The MFD is given by:

$$MFD = 2w$$

$$w = \left[ 2 \cdot \frac{\int_0^\infty (f(r))^2 r dr}{\int_0^\infty \left(\frac{df(r)}{dr}\right)^2 r dr} \right]^{1/2}$$

where f(r) is the transverse component of the electric field distribution of the guided optical signal and r is radial position in the fiber. The MFD depends on the wavelength of the optical signal and is reported herein for wavelengths of 850 nm, 980 nm, 1060 nm, 1310 nm, and/or 1550 nm.

The "core volume" $V_1$ is defined as:

$$V_1 = 2 \int_0^{r_1} \Delta_1(r) r dr.$$

Where $r_1$ is the outer radius of the refractive index profile of the core region, $\Delta_1(r)$ is the relative refractive index of the core region of the refractive index profile, and r is radial position in the fiber. The core volume $V_1$ is a positive quantity and will be expressed herein in units of % $\Delta$-$\mu m^2$, which may also be expressed as % $\Delta\mu m^2$ or % $\Delta$-micron$^2$, or % $\Delta$-sq. microns.

The "effective area" of an optical fiber is defined as:

$$A_{eff} = \frac{2\pi \left[\int_0^\infty (f(r))^2 r dr\right]^2}{\int_0^\infty (f(r))^4 r dr}$$

where f(r) is the transverse component of the electric field of the guided optical signal and r is radial position in the fiber. The effective area" or "$\Delta_{eff}$" depends on the wavelength of the optical signal and is understood herein to refer to wavelengths of 1310 nm and 1550 nm unless otherwise noted.

The zero-dispersion wavelength is denoted $\lambda_0$ and is the wavelength where material dispersion and waveguide dispersion cancel each other. In silica-based optical fibers, the zero-dispersion wavelength is about 1310 nm, e.g., in the range from 1300 nm to 1324 nm, depending on the dopants used to form the optical fiber.

The operating wavelength is denoted by $\lambda$ and is a wavelength at which the optical fiber is designed to function. In the discussion below, the fiber 6S has one operating wavelength for SM operation and another operating wavelength for few mode operation, and which operating wavelength is being referred to will be apparent from the discussion. The operating wavelength is also referred to below as just the wavelength unless the context of the discussion requires distinguishing from other wavelengths.

The term "SM" when referring to an optical fiber means that the optical fiber supports a single linear polarized (LP) mode at the (SM) operating wavelength.

The term "few mode" or "few moded" refers to an optical fiber that supports two or three LP modes or mode groups, at the given (few mode) operating wavelength.

The cable cutoff wavelength is denoted $\lambda_C$ and is the minimum wavelength at which the optical fiber will support only one propagating mode. For wavelengths below the cutoff wavelength $\lambda_C$, MM or FM transmission may occur and an additional source of modal dispersion may arise to limit the fiber's information carrying capacity. It is noted that a fiber cutoff wavelength $\lambda_{CF}$ is based on a 2-meter fiber length while the cable cutoff wavelength $\lambda_C$ is based on a 22-meter cabled fiber length. The 22-meter cable cutoff wavelength $\lambda_C$ is typically less than the 2-meter fiber cutoff wavelength $\lambda_{CF}$ due to higher levels of bending and mechanical pressure in the cable environment. Thus, the SM operating wavelength $\lambda$ has a lower limit of $\lambda_C$. In the discussion below, the cable cutoff wavelength $\lambda_C$ is equal to or below 1260 nm, and further in an example is in the wavelength range from 1160 nm to 1260 nm.

The overfilled bandwidth is denoted OFL BW and measured in units of MHz·km or GHz·km. For the bandwidth measurement, all the propagating modes are excited with comparable weights, which is essentially the overfilled bandwidth.

The effective modal bandwidth (also called the "modal bandwidth") is denoted EMB BW and is also measured in units of MHz·km or GHz·km. The EMB BW is the actual modal bandwidth observed in a link for a specific fiber with a specific source. The EMB BW is defined with the assumptions of the IEEE P802.3ae link model.

The terms "modal bandwidth" or "bandwidth" or just "BW" are used in this application refer to OFL BW unless specified otherwise.

The abbreviation "b-b" stands for "back-to-back."

It is noted that a standard step-index SM fiber can be few moded (i.e., can support two or three mode groups) below the cable cutoff wavelength $\lambda_C$ (e.g., 1260 nm), but as emphasized herein, the OFL BW and the EMB BW bandwidths for few-mode operation are too low for practical use in data center applications.

Properties of Standard SM and MM Optical Fibers

The standard SM optical fiber referred to herein has optical properties according to the G.652 industry standards known in the art and as set forth by International Telecommunication Union (ITU). A standard SM optical fiber has a relatively small core of about 9 microns in diameter and a numerical aperture (NA) of about 0.12. A standard single-mode fiber is designed to have a cable cutoff wavelength $\lambda_C$ below (i.e., less than) 1260 nm so the fiber supports only one mode at 1310 nm and supports a few modes at a wavelength in the range from 850 nm to 1100 nm. Typically, a standard SM fiber has a step index profile associated with a very high alpha parameter (e.g., a>10). The step index profile is simple, but the bandwidth at 850 nm is low. Consequently, a standard SM fiber with a step index is not suitable for MM (including few-mode) transmission at 850 nm. An example standard SM optical fiber is Corning® SMF-28®, available from Corning, Inc., Corning, New York.

By comparison, a MM fiber has a relatively large core of 50 microns or 62.5 microns in diameter and a numerical aperture (NA) of greater than about 0.2. Standard MM optical fibers are denoted OM1 through OM5 and have select optical properties according to industry standards set forth by Telecommunication Industry Association (TIA). Due to material dispersion, the maximum achievable EMB bandwidth of such MM fibers is no more than about 12 GHz·km.

Table 1 below provides a comparison of different MM and SM optical fibers for short reach applications. In Table 1, the overfilled launched bandwidth (OFL BW) and the effective modal bandwidth (EMB BW) are each measured in MHz·km, and the link distance d in the last row stands for "2 to 10 km at 1310 nm." The symbol "N/A" stands for "not applicable." The acronym SMF stands for "SM fiber," while the acronyms OM1 through OM5 represents different industry standard MM fibers. In the table, "*" means that the measurement is for short wavelength division multiplexing (SWDM) using four wavelengths of 850, 880, 910 and 940 nm

TABLE A

Standard MM and SM fiber properties

| Fiber | NA | $r_1$ | OFL BW 850 nm | OFL BW 1310 nm | EMB BW 850 nm | EMB BW 953 nm | Link Distance (m) 1G | 10G | 40G | 100G | 40G* | 100G* |
|---|---|---|---|---|---|---|---|---|---|---|---|---|
| OM1 | 0.28 | 62.5 | 200 | 500 | N/A | N/A | 275 | 33 | N/A | N/A | N/A | N/A |
| OM2 | 0.2 | 50 | 500 | 500 | N/A | N/A | 550 | 82 | N/A | N/A | N/A | N/A |
| OM3 | 0.2 | 50 | 1500 | 500 | 2000 | N/A | N/A | 300 | 100 | 100 | 240 | 75 |
| OM4 | 0.2 | 50 | 3500 | 500 | 4700 | N/A | N/A | 550 | 150 | 150 | 350 | 100 |
| OM5 | 0.2 | 50 | 3500 | 500 | 4700 | 2470 | N/A | 550 | 150 | 150 | 440 | 150 |
| SMF | 0.12 | 9 | N/A | N/A | N/A | N/A | d | d | d | d | N/A | N/A |

Table A shows that the link distance for standard MM fibers is between 33 meters to 550 meters depending on the data rate. This is too short to cover hyperscale data centers that have link distances up to a couple of kilometers. On the other hand, the standard SM fiber can provide longer link distances, e.g., between 2 km and 10 km. This is why standard SM fiber is used for hyperscale data centers. While the standard SM fiber is typically few-moded at the shorter wavelengths of interest (e.g., 850 nm to 1100 nm), the OFL modal bandwidth in this wavelength range is too small to be of practical use for short-distance data links currently provided with MM VCSELS and standard MM fiber in this wavelength range. This is a problem because data centers have many short-distance links, e.g., less than a few hundred meters.

Figure 1B:
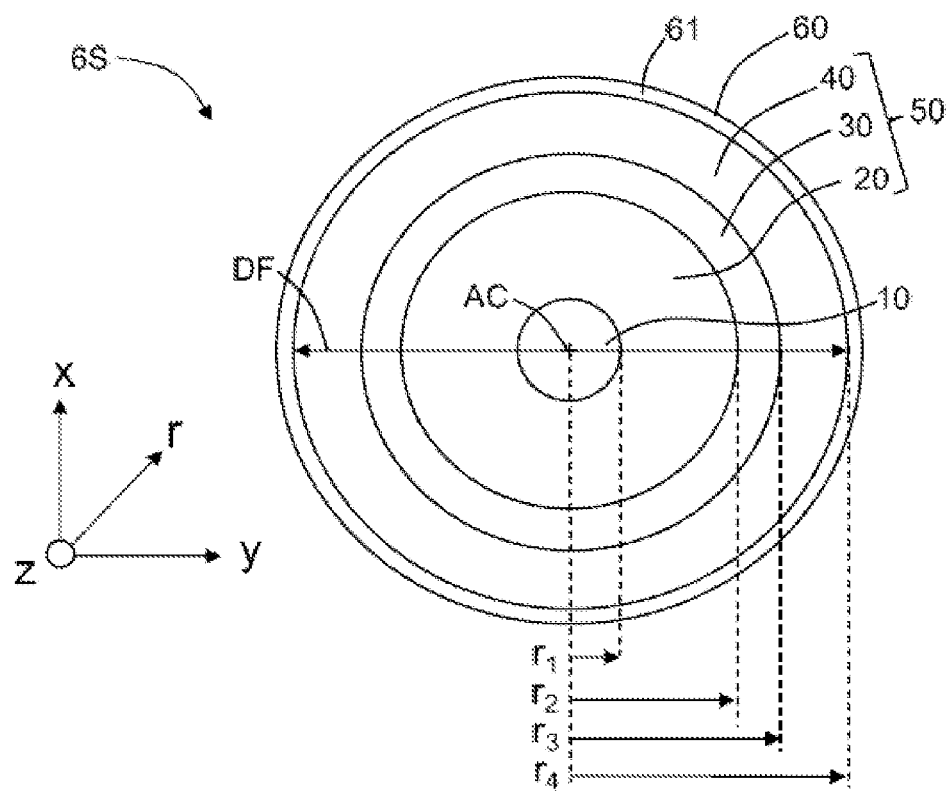
FIG. 1B is a cross-sectional view of the single-core optical fiber of FIG. 1.

FIG. 1A is a schematic elevated view of a section of an example single-core (SC) optical fiber 6S configured to be used effectively with FM and MM VCSELs and formed using the methods disclosed herein. FIG. 1B is an x-y cross-sectional view of the SC fiber 6S.

In the discussion below, the single-core fiber 6S is simply referred to as "fiber" 6S.

The fiber 6S can have a number of different physical configurations set forth below that provide it with the desired optical characteristics for use with FM and SM VCSELs. In an example, the physical configuration of the fiber 6S defines a cable cutoff wavelength $\lambda_C$ less than or equal to 1260 nm and an MFD in the range from 8.0 µm≤MFD≤9.5 µm at a wavelength λ of 1310 nm, or an MFD in the range from 9.3 µm≤MFD≤10.9 µm at a wavelength λ of 1550 nm. This ensures that the fiber 6S is SM at a wavelength λ greater than or equal to 1260 nm and is compatible with the standard SM fiber for splicing and connectorization.

The fiber 6S can also have a zero-dispersion wavelength $\lambda_0$ within the wavelength range from 1300 nm to 1324 nm, which is the same as for a standard SM fiber. However, the dispersion requirement can be relaxed for the fiber 6S for short-link applications, e.g., <2 km. The relaxation of the dispersion requirement allows for the fiber 6S to have a higher NA and a larger core size (radius $r_1$) than that for a standard SM fiber for easy coupling to SM or FM VCSELs and for improved bending performance.

Example Physical Configurations

Figure 2A:
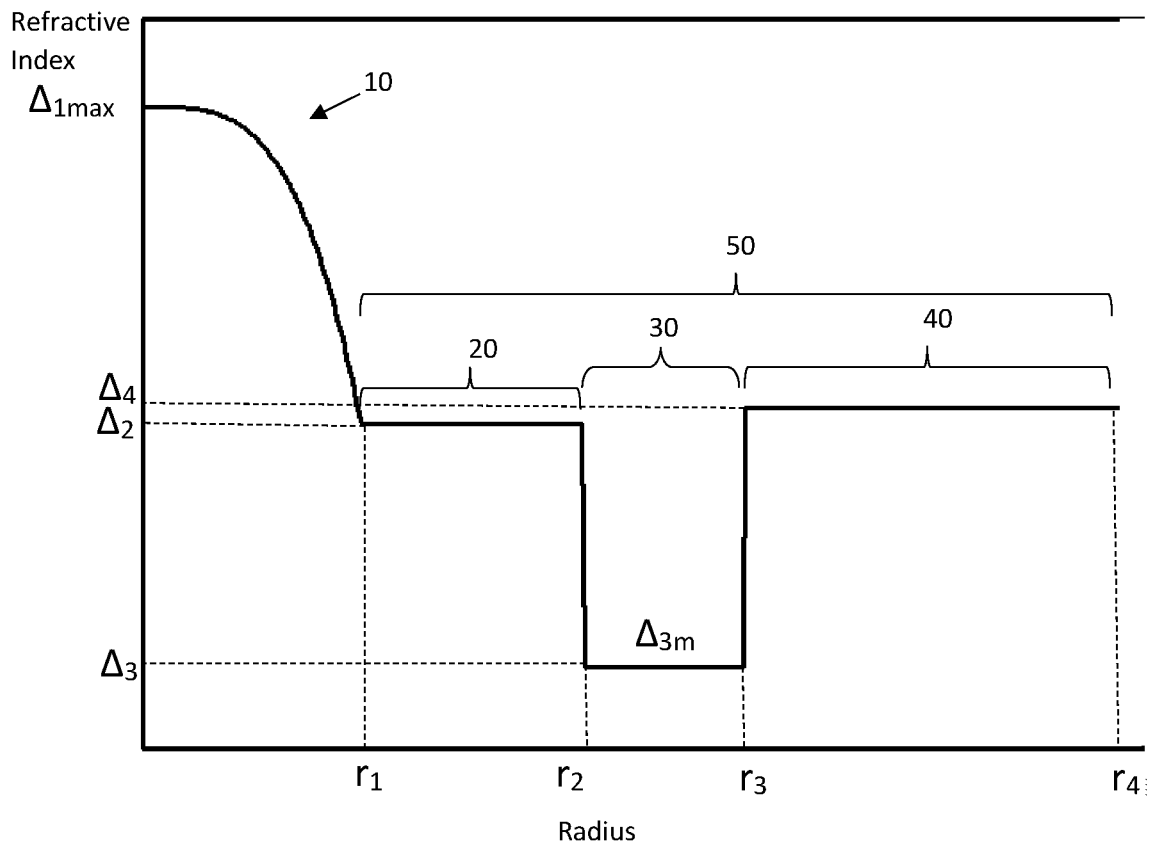
FIGS. 2A through 2C are example relative refractive index profiles of the single-core optical fiber as disclosed herein.

FIG. 2A is an example physical configuration of the fiber 6S in the form of a plot of the relative refractive index Δ % (r) versus the radial coordinate r. The fiber 6S is SM for wavelengths less than or equal to than $\lambda_C$=1260 nm and is configured to have a low bending loss.

The fiber 6S has a centerline AC shown by way of example as running in the z-direction. The fiber 6S comprises a glass core region ("core") 10 that is centered on the centerline AC and that has a radial extent $r_1$ and a relative refractive index $\Delta_1$, with a maximum value $\Delta_{1max}$ on the centerline AC (i.e., at r=0). The core 10 has a graded index as defined by an alpha value a≥3. One advantage of having a graded index profile is that it reduces the differential group delays among different modes after propagating through a length of fiber thus increasing the modal bandwidth. Another advantage of having a graded index profile design is that it provides a gradual transition of the relative refractive index Δ from the core to the cladding, which minimizes loss contributions due to core-clad interface imperfections.

The core 10 is immediately surrounded by a glass cladding region ("cladding") 50 that extends from the core radius $r_1$ out to a cladding outer radius $r_4$. In the example configuration of FIG. 2A, the cladding 50 includes an inner cladding region ("inner cladding") 20 closest to the core and extending from the core radius $r_1$ to a radius $r_2$ and having a relative refractive index $\Delta_2<\Delta_1$; an intermediate cladding region or "trench" 30 immediately adjacent the inner cladding 20 and extending from the radius $r_2$ to a radius $r_3$ and having a relative refractive index $\Delta_3<\Delta_2$; and an outer cladding region ("outer cladding") 40 immediately adjacent the trench 30 and extending from the radius $r_3$ to the outer cladding radius $r_4$ and having a relative refractive index $\Delta_4$, wherein $\Delta_3 \leq \Delta_4$.

Figure 2B:
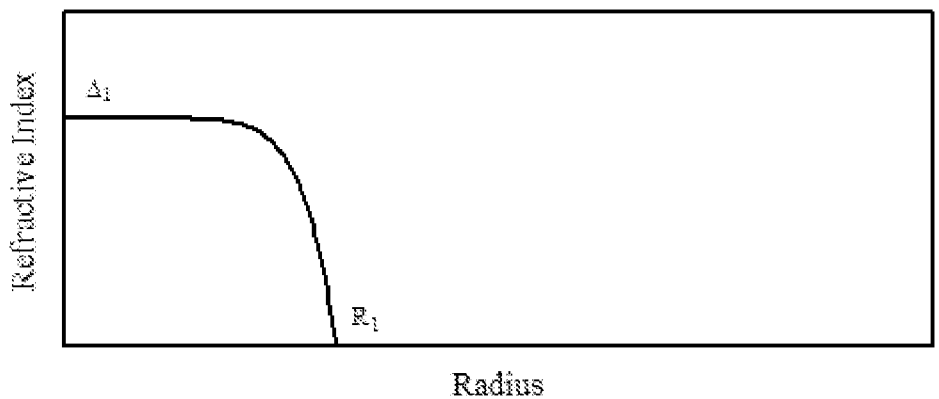
Figure 2C:
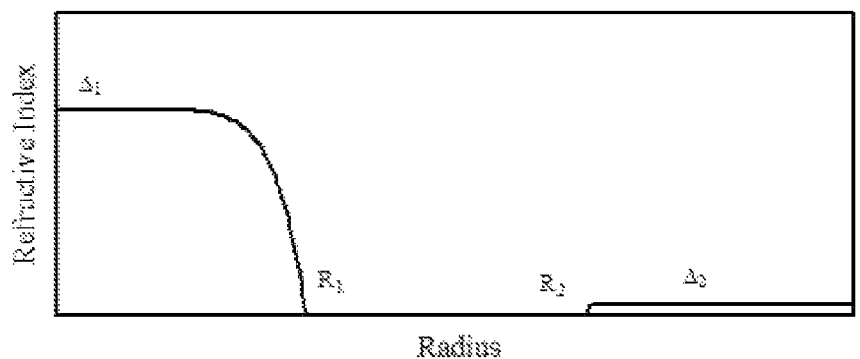

In embodiments, the core 10 has a graded index profile with an alpha value greater than or equal to 3. In an alternative embodiment, the core 10 of the fiber 6S has a step index profile with an alpha value greater than or equal to 5. In embodiments, the core 10 has an alpha value of greater than or equal to 3.5 to less than or equal to 5.5. In embodiments, the core 10 has an alpha value of greater than or equal to 3.5 to less than or equal to 15. FIG. 2B is an example physical configuration of the fiber 6S with a step index profile in the form of a plot of the relative refractive index Δ % (r) versus the radial coordinate r. FIG. 2C is an example of a physical configuration of the fiber 6S with a step index profile and an updoped region in the form of a plot of the relative refractive index Δ % (r) versus the radial coordinate r.

In embodiments, the core 10 has a relative refractive index change $\Delta_1$ that is greater than or equal to 0.3 and less than or equal to 0.5%, and core radius $r_1$ greater than or equal to 4.6 and less than or equal to 5.6 µm. In embodiments, the core 10 has a relative refractive index change $\Delta_1$ that is greater than or equal to 0.34 and less than or equal to 0.37. In embodiments, the core 10 has a relative refractive index change $\Delta_1$ that is greater than or equal to 0.25 and less than or equal to 0.4. In embodiments, the core 10 has a core radius $r_1$ greater than or equal to 4.6 and less than or equal to 5 µm. In embodiments, the core 10 has a core radius $r_1$ greater than or equal to 3.6 and less than or equal to 5 µm. In embodiments, the inner cladding 20 has a relative refractive index change $\Delta_2$ greater than or equal to −0.002% and less than or equal to 0.002%, and a radius $r_2$ greater than or equal to 10 µm and less than or equal to 12 µm. In embodiments, the inner cladding 20 has a relative refractive index change $\Delta_2$ greater than or equal to −0.02% and less than or equal to 0.02%. In embodiments, the inner cladding 20 has a radius $r_2$ greater than or equal to 10 µm and less than or equal to 62.5 µm. In embodiments, the trench 30 has a relative refractive index change $\Delta_3$ greater than or equal to −0.7% and less than or equal to −0.1%, and a radius $r_3$ greater than or equal to 10 µm and less than or equal to 18 µm. In embodiments, the trench volume IV is greater than or equal to 20% µm$^2$ and less than or equal to 50% µm$^2$. The outer cladding 40 has a relative refractive index change $\Delta_4$ in the range from 0.0% to 0.1%, and radius of $r_4$ extends to the end of fiber cladding. Typically, $r_4$ is 62.5 µm for standard optical fiber. Other cladding radius $r_4$ can be used, for example, 40 µm, 75 µm, and 100 µm. Proper combination of the fiber parameters in the ranges described above can result in optical fiber properties that meet standard SM fiber requirements for 1310 nm or 1550 nm SM transmission and bandwidth requirements for few mode transmission at a wavelength in the range from 850 nm to 1100 nm. In addition, the core diameter of the disclosed fiber is greater than 11 µm, and the NA is greater than 0.11, which are suitable for coupling SM VCSELs to the fiber.

In an example, the example fiber 6S includes a protective coating 60 made of a non-glass material 61, such as a polymeric material.

Design Examples

Eighteen design examples of the fiber 6S having a graded index core are set forth in Tables 1 and Table 2, below. Table 1 shows the fiber profile parameters of Fiber 1A to Fiber 13. Table 2A and 2B show the corresponding optical properties of the fibers shown in Table 1. Fibers 1A to Fiber 5A have a modal bandwidth optimized at 980 nm, with the peak bandwidth at about 980 nm. They also have MFD, $\lambda_0$ and chromatic dispersion in compliance with ITU-T G.652 standard for standard single-mode fibers. Fibers 1A to Fiber 5A have a fiber cutoff that is above 1360 nm or in some cases above 1400 nm with the cable cutoff typically 100 nm lower than the fiber cutoff. Accordingly, Fiber 1A to Fiber 5A do not meet the ≤1260 nm cable cutoff requirements for many standard single mode fiber products. In order to reduce the fiber cutoff or cable cutoff to meet standard single mode fiber requirements, an updopant is introduced in Fiber 1B to Fiber 5B so that the fiber cutoff is less than 1330 nm for all five design examples and the cable cutoff is <1260 nm. Fiber 1B to Fiber 5B have alpha values of 3.5 to 4.8 while achieving optimal modal bandwidth at about 980 nm. In Fiber 1B to Fiber 5B, the updoping has a relatively small effect on the peak wavelength. This effect has been mitigated by an adjustment of the core delta relative to design examples, Fiber 1A to Fiber 5A. In Fiber 6 and Fiber 7 the peak wavelength is tuned to 1060 nm with the modal bandwidth optimized at 1060 nm.

Fiber 8 to Fiber 13 contain a trench structure to form a bending insensitive fiber. The cable cutoff of Fiber 8 to Fiber 13 is also below 1260 nm. Fiber 8, Fiber 12 and Fiber 13 have a trench region but without the updoping region. Fiber 9 to Fiber 11 have both the trench and the updoping region starting at $r_3$.

TABLE 1

Exemplary Fiber Profile Parameters

| Fiber Example | Δ1 (%) | R1 (um) | alpha | Δ2 (%) | R2 (um) | R3 (um) | Δ3 (%) | Trench Volume (% µm$^2$) | Δ4 (%) |
|---|---|---|---|---|---|---|---|---|---|
| Fiber1A | 0.398 | 5.45 | 3.5 | 0 | n/a | n/a | n/a | n/a | n/a |
| Fiber1B | 0.4 | 5.45 | 3.5 | 0 | n/a | 10 | n/a | n/a | 0.02 |
| Fiber2A | 0.38 | 5.4 | 3.75 | 0 | n/a | n/a | n/a | n/a | n/a |
| Fiber2B | 0.383 | 5.4 | 3.75 | 0 | n/a | 10 | n/a | n/a | 0.02 |
| Fiber3 A | 0.375 | 5.3 | 4 | 0 | n/a | n/a | n/a | n/a | n/a |
| Fiber3B | 0.377 | 5.3 | 4 | 0 | n/a | 10 | n/a | n/a | 0.02 |
| Fiber4A | 0.38 | 5.1 | 4.35 | 0 | n/a | n/a | n/a | n/a | n/a |
| Fiber4B | 0.382 | 5.1 | 4.35 | 0 | n/a | 10 | n/a | n/a | 0.02 |
| Fiber5A | 0.37 | 5 | 4.8 | 0 | n/a | n/a | n/a | n/a | n/a |
| Fiber5B | 0.372 | 5 | 4.8 | 0 | n/a | 10 | n/a | n/a | 0.02 |
| Fiber 6 | 0.42 | 5.58 | 3.94 | 0 | n/a | 8 | n/a | n/a | 0.04 |
| Fiber 7 | 0.4 | 5.2 | 4.78 | 0 | n/a | 13 | n/a | n/a | 0.03 |
| Fiber8 | 0.397 | 5.1 | 4 | 0 | 11 | 15 | −0.3 | −31.2 | n/a |
| Fiber9 | 0.45 | 5.1 | 3.5 | 0 | 11 | 15 | −0.4 | −41.6 | 0.02 |
| Fiber10 | 0.46 | 4.7 | 5.16 | 0 | 11 | 15 | −0.3 | −31.2 | 0.02 |
| Fiber11 | 0.45 | 4.65 | 4.9 | 0 | 11 | 15 | −0.3 | −31.2 | 0.02 |
| Fiber12 | 0.34 | 4.67 | 7.01 | 0 | 11 | 15 | −0.4 | −41.6 | n/a |
| Fiber13 | 0.36 | 4.5 | 12.04 | 0 | 11 | 15 | −0.4 | −41.6 | n/a |

TABLE 2A

Optical Properties of Fiber Profile in Table 1

| Fiber Example | MFD @ 1310 nm (um) | MFD @ 1550 nm (um) | Lambda_0 (nm) | Fiber Cutoff (nm) | Dispersion at 1550 nm (ps/nm · km) | Lp (nm) |
|---|---|---|---|---|---|---|
| Fiber1A | 9.04 | 10.18 | 1305.9 | 1426.6 | 17.52 | 980 |
| Fiber1B | 9.03 | 10.18 | 1306.1 | 1329 | 17.35 | 980 |
| Fiber2A | 9.15 | 10.33 | 1305.8 | 1400.2 | 17.45 | 980 |
| Fiber2B | 9.14 | 10.32 | 1306.4 | 1303.7 | 17.27 | 980 |
| Fiber3A | 9.15 | 10.34 | 1306.7 | 1382.4 | 17.31 | 980 |
| Fiber3B | 9.14 | 10.34 | 1307.4 | 1284.5 | 17.11 | 980 |
| Fiber4A | 9 | 10.19 | 1309.2 | 1360 | 16.98 | 980 |
| Fiber4B | 8.99 | 10.19 | 1309.9 | 1264.8 | 16.78 | 980 |
| Fiber5A | 9.03 | 10.25 | 1310.2 | 1338.1 | 16.83 | 980 |
| Fiber5B | 9.02 | 10.25 | 1311 | 1243.2 | 16.61 | 980 |
| Fiber6 | 9.08 | 10.29 | 1300 | 1368 | 17.86 | 1060 |
| Fiber7 | 8.98 | 10.19 | 1301.4 | 1291.2 | 17.73 | 1060 |

TABLE 2B

Optical Properties of Fiber Profile in Table 1

| Fiber Example | MFD @ 1310 nm (um) | MFD @ 1550 nm (um) | Lambda_0 (nm) | Cable Cutoff (nm) | Dispersion at 1550 nm (ps/nm · km) | Lp (nm) |
|---|---|---|---|---|---|---|
| Fiber8 | 8.84 | 9.94 | 1307.2 | 1250 | 17.8 | 980 |
| Fiber9 | 8.47 | 9.51 | 1309 | 1240 | 17.54 | 980 |
| Fiber10 | 8.28 | 9.34 | 1307 | 1249 | 17.39 | 1060 |
| Fiber11 | 8.44 | 9.5 | 1304.6 | 1210 | 17.75 | 1060 |
| Fiber12 | 9.19 | 10.45 | 1308.4 | 1193.5 | 17.8 | 980 |
| Fiber 13 | 9 | 10.16 | 1304.3 | 1251 | 17.95 | 1060 |

Figure 3:
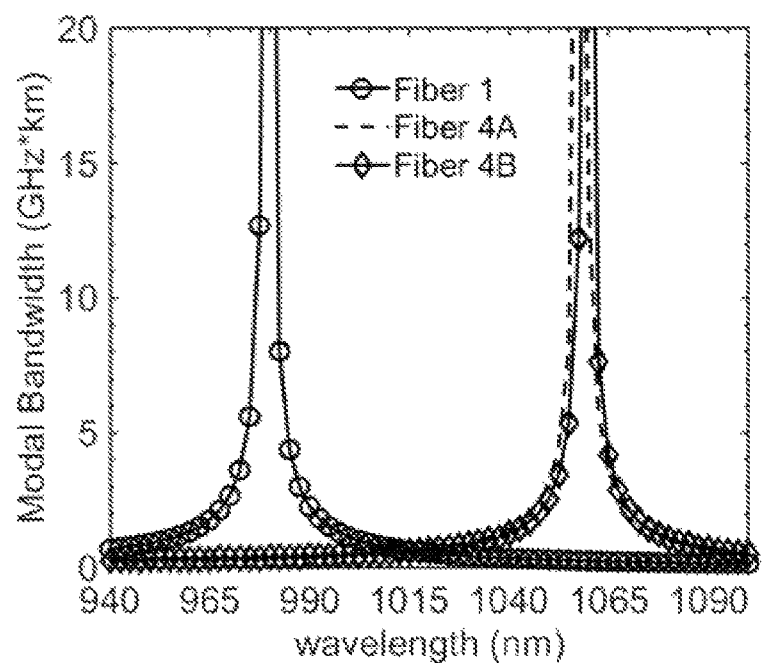
FIG. 3 is a graph of modeled bandwidth as a function of wavelength for several fiber design examples as disclosed herein.

Nine design examples of the fiber 6S having a step-index core are set forth in Tables 3 and Table 4 below. Table 3 shows the fiber profile parameters of Fiber 14 to Fiber 19B. Table 4 shows the corresponding optical properties of the fibers shown in Table 3. Fibers 14 to Fiber 19B have an optimal modal bandwidth at either 980 nm or 1060 nm. Fiber 14 to Fiber 19B have optical properties, shown in Table 4, in compliance with ITU-T G.652 standard for standard single-mode fibers. Fiber 14, Fiber 15 and Fiber 16 have a peak wavelength at 980 nm and a fiber cutoff in the range from 1279 to 1316 nm. Since the cable cutoff is typically 100 nm lower than the fiber cutoff, Fiber 14, Fiber 15 and Fiber 16 meet the 1260 nm cable cutoff requirements for many standard single mode fiber products. Fiber 17A, Fiber 18A and Fiber 19A are only step-index cores having fiber cutoff values at about 1350 nm or higher. Fiber 17, Fiber 18, and Fiber 19B contain step-index cores and an added updoping region. The updoping region reduces the fiber cutoff by about 80 nm to 100 nm so that the cable cutoff of Fiber 17B, Fiber 18B, and Fiber 19B is less than 1260 nm. FIG. 3 depicts the modeled bandwidth as a function of wavelength for Fiber 14, Fiber 17A, and Fiber 17B shown in Table 3. FIG. 3 shows that the peak wavelength of Fiber 14 is about 980 nm, and the peak wavelengths for Fiber 17A and Fiber 17B are about 1057.5 nm and about 1060 nm, respectively. The wavelength range that the fibers can have high modal bandwidth is in the range of about 22 nm to about 25 nm for bandwidth above 2 GHz·km.

TABLE 3

| Fiber Example | $\Delta_1$ (%) | $R_1$ (um) | alpha | $R_2$ (um) | $\Delta_2$ (%) |
|---|---|---|---|---|---|
| Fiber 14 | 0.34 | 4.67 | 7.5 | n/a | n/a |
| Fiber 15 | 0.345 | 4.65 | 7.5 | n/a | n/a |
| Fiber 16 | 0.36 | 4.95 | 5.5 | n/a | n/a |

TABLE 3-continued

| Fiber Example | $\Delta_1$ (%) | $R_1$ (um) | alpha | $R_2$ (um) | $\Delta_2$ (%) |
|---|---|---|---|---|---|
| Fiber 17A | 0.36 | 4.9 | 7.5 | n/a | n/a |
| Fiber 17B | 0.365 | 4.9 | 7.5 | 10 | 0.02 |
| Fiber 18A | 0.345 | 4.7 | 11.5 | n/a | n/a |
| Fiber 18B | 0.35 | 4.7 | 11.5 | 10 | 0.02 |
| Fiber 19A | 0.34 | 4.65 | 15 | n/a | n/a |
| Fiber 19B | 0.34 | 4.65 | 15 | 10 | 0.02 |

TABLE 4

| Fiber Example | MFD @ 1310 nm (um) | MFD @ 1550 nm (um) | Lambda_0 (nm) | Fiber Cutoff (nm) | Dispersion at 1550 nm (ps/nm · km) | Lp (nm) |
|---|---|---|---|---|---|---|
| Fiber 14 | 9.16 | 10.46 | 1313.6 | 1282 | 16.45 | 980 |
| Fiber 15 | 9.1 | 10.39 | 1313.8 | 1279 | 16.35 | 982.5 |
| Fiber16 | 9.19 | 10.33 | 1310.2 | 1316.4 | 16.82 | 982.5 |
| Fiber 17A | 9.13 | 10.3 | 1303 | 1376 | 17.39 | 1057.5 |
| Fiber 17B | 9.1 | 10.27 | 1303.96 | 1288.4 | 17.23 | 1060 |
| Fiber 18A | 9.2 | 10.4 | 1304.73 | 1348 | 17.22 | 1057.5 |
| Fiber 18B | 9.16 | 10.37 | 1305.1 | 1261 | 17.01 | 1060 |
| Fiber 19A | 9.25 | 10.46 | 1303.8 | 1350 | 17.3 | 1060 |
| Fiber 19B | 9.26 | 10.49 | 1304.86 | 1251.7 | 17.04 | 1060 |

Design Examples

Tables 5A though 5C below set forth design parameters for an example fiber 6 that permits operating wavelengths λ in the range from about 850 nm to about 1310 nm and has a cutoff wavelength that is less than 1000 nm. Tables 5A-5C set forth several exemplary refractive index profiles.

TABLE 5A

| | Units | Example 20 | Example 21 | Example 22 | Example 23 |
|---|---|---|---|---|---|
| Centerline Delta, $\Delta_0$ | Δ % | 0.334 | 0.311 | 0.325 | 0.303 |
| Core Delta, $\Delta_1$ | Δ % | 0.334 | 0.311 | 0.325 | 0.303 |
| Core Radius, $R_1$ | microns | 4.63 | 4.71 | 4.64 | 4.64 |
| Core Alpha | | 4.19 | 4.30 | 4.07 | 4.80 |
| Core Vol | % Δ-sq. microns | 4.86 | 4.70 | 4.69 | 4.60 |
| Moat Delta, $\Delta_2$ | Δ % | −0.263 | −0.275 | −0.297 | −0.335 |
| Moat Inside Radius, $R_3$ | microns | 7.96 | 8.28 | 7.74 | 8.39 |
| Moat Outside Radius, $R_4$ | microns | 14.00 | 13.87 | 14.77 | 13.24 |
| Moat Vol | % Δ-sq. microns | −34.9 | −34.0 | −47.0 | −35.2 |
| Core-Clad Ratio | | 0.58 | 0.57 | 0.60 | 0.55 |
| 1310 nm MFD | microns | 8.93 | 9.20 | 8.94 | 9.24 |
| 1550 nm MFD | microns | 10.01 | 10.32 | 9.98 | 10.33 |
| 1310 nm Dispersion | ps/nm/km | 0.44 | 0.58 | 0.81 | 0.80 |
| 1310 nm Slope | ps/nm2/km | 0.092 | 0.093 | 0.093 | 0.093 |
| Zero Dispersion | nm | 1305.2 | 1303.7 | 1301.2 | 1301.4 |
| 1 × 15 mm bend loss | dB/turn | 0.02 | 0.06 | 0.03 | 0.08 |
| 1 × 10 mm bend loss | dB/turn | 0.04 | 0.13 | 0.06 | 0.16 |
| Theoretical Cutoff | nm | 1080 | 1064 | 1055 | 1055 |
| Overfilled BW at 850 nm | GHz-km | 9.25 | 6.90 | 19.54 | 5.31 |

TABLE 5A-continued

| | Units | Example 20 | Example 21 | Example 22 | Example 23 |
|---|---|---|---|---|---|
| Delta Tau (LP11-LP01) | ns/km | 0.034 | −0.046 | −0.016 | 0.060 |
| 1310 nm Pin Array | dB | 1.41 | 4.52 | 2.13 | 5.65 |

TABLE 5B

| | Units | Example 24 | Example 25 | Example 26 | Example 27 |
|---|---|---|---|---|---|
| Centerline Delta, $\Delta_0$ | % | 0.270 | 0.270 | 0.270 | 0.270 |
| Core Delta, $\Delta_1$ | % | 0.286 | 0.288 | 0.312 | 0.294 |
| Core Radius, $R_1$ | microns | 4.43 | 4.46 | 4.18 | 4.51 |
| Core Alpha | | 4.62 | 4.03 | 3.98 | 3.74 |
| Core Vol | % $\Delta$-sq. microns | 3.92 | 3.83 | 3.62 | 3.90 |
| Moat Delta, $\Delta_2$ | % | −0.287 | −0.355 | −0.318 | −0.354 |
| Moat Inside Radius, $R_3$ | microns | 9.11 | 8.49 | 8.15 | 8.96 |
| Moat Outside Radius, $R_4$ | microns | 15.49 | 16.05 | 15.57 | 16.86 |
| Moat Vol | % $\Delta$-sq. microns | −45.1 | −65.9 | −55.9 | −72.2 |
| Core-Clad Ratio | | 0.49 | 0.52 | 0.51 | 0.50 |
| 1310 nm MFD | microns | 9.49 | 9.35 | 9.03 | 9.40 |
| 1550 nm MFD | microns | 10.74 | 10.46 | 10.17 | 10.58 |
| 1310 nm Dispersion | ps/nm/km | 0.08 | 0.69 | 0.05 | 0.03 |
| 1310 nm Slope | ps/nm2/km | 0.093 | 0.094 | 0.093 | 0.093 |
| Zero Dispersion | nm | 1309.2 | 1302.6 | 1309.5 | 1306.7 |
| 1 × 15 mm bend loss | dB/turn | 0.14 | 0.11 | 0.11 | 0.08 |
| 1 × 10 mm bend loss | dB/turn | 0.26 | 0.21 | 0.21 | 0.16 |
| Theoretical Cutoff | nm | 1028 | 1010 | 989 | 1026 |
| Overfilled BW at 850 nm | GHz-km | 20.43 | 15.76 | 7.45 | 6.19 |
| Delta Tau (LP11-LP01) | ns/km | 0.016 | 0.020 | −0.043 | −0.051 |
| 1310 nm Pin Array | dB | 9.50 | 7.52 | 7.56 | 5.67 |

TABLE 5C

| | Units | Example 28 | Example 29 | Example 30 | Example 31 |
|---|---|---|---|---|---|
| Centerline Delta, $\Delta_0$ | % | 0.230 | 0.230 | 0.230 | 0.230 |
| Core Delta, $\Delta_1$ | % | 0.320 | 0.352 | 0.308 | 0.321 |
| Core Radius, $R_1$ | microns | 4.17 | 3.97 | 4.28 | 4.27 |
| Core Alpha | | 4.21 | 4.10 | 4.03 | 3.74 |
| Core Vol | % $\Delta$-sq. microns | 3.78 | 3.72 | 3.78 | 3.81 |
| Moat Delta, $\Delta_2$ | % | −0.322 | −0.321 | −0.308 | −0.299 |
| Moat Inside Radius, $R_3$ | microns | 8.22 | 8.00 | 8.02 | 7.89 |
| Moat Outside Radius, $R_4$ | microns | 14.94 | 16.01 | 16.19 | 15.02 |
| Moat Vol | % $\Delta$-sq. microns | −50.1 | −61.7 | −61.0 | −48.8 |
| Core-Clad Ratio | | 0.51 | 0.50 | 0.53 | 0.54 |
| 1310 nm MFD | microns | 9.00 | 8.65 | 9.10 | 8.98 |
| 1550 nm MFD | microns | 10.14 | 9.79 | 10.21 | 10.09 |
| 1310 nm Dispersion | ps/nm/km | −0.08 | −0.72 | 0.36 | 0.21 |
| 1310 nm Slope | ps/nm2/km | 0.093 | 0.093 | 0.093 | 0.093 |
| Zero Dispersion | nm | 1310.9 | 1317.8 | 1306.2 | 1307.7 |
| 1 × 15 mm bend loss | dB/turn | 0.11 | 0.05 | 0.11 | 0.11 |
| 1 × 10 mm bend loss | dB/turn | 0.20 | 0.09 | 0.21 | 0.21 |
| Theoretical Cutoff | nm | 994 | 992 | 990 | 994 |
| Overfilled BW at 850 nm | GHz-km | 22.86 | 17.43 | 14.66 | 10.26 |
| Delta Tau (LP11-LP01) | ns/km | −0.014 | −0.018 | 0.022 | 0.031 |
| 1310 nm Pin Array | dB | 7.32 | 3.13 | 7.66 | 7.43 |

Figure 6:
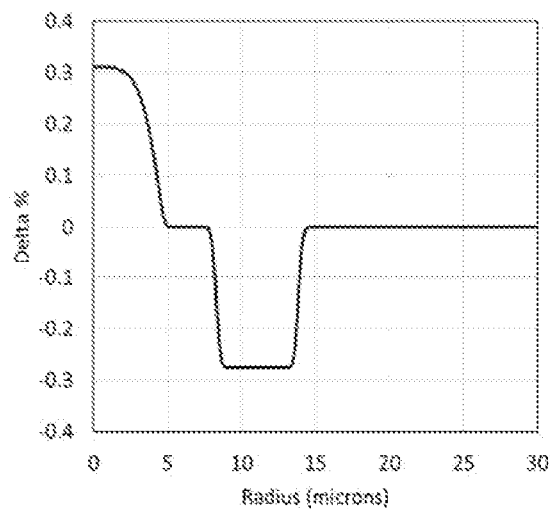
FIG. 6 is a refractive index profile for Example 21 of Table 5A as disclosed herein.
Figure 7:
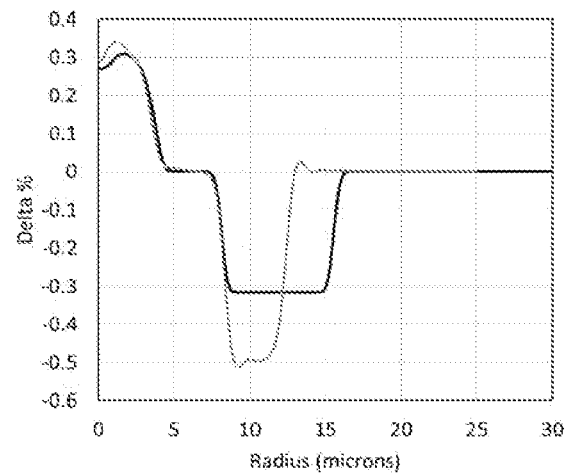
FIG. 7 is a refractive index profile for Example 26 of Table 5B as disclosed herein.

FIG. 6 depicts a refractive index profile for Example 21 of Table 5A without a centerline dip. FIG. 7 depicts a refractive index profile 702 for Example 26 of Table 5B with a small centerline dip. The light grey curve (704) is the measured refractive index profile of a prototype fiber described in Table 6 below.

TABLE 6

| Parameter | Prototype |
|---|---|
| $\Delta_{1MAX}$ (%) | 0.340 |
| $r_1$ (microns) | 4.15 |
| $V_1$ (%-sq. microns) | 3.06 |
| Alpha | 3.56 |
| $\Delta_2$ (%) | 0.0 |
| $r_2$ (microns) | 8.30 |
| $\Delta_{3MIN}$ (%) | −0.50 |
| $r_3$ (microns) | 12.40 |
| $r_1/r_2$ | 0.56 |
| $V_3$ (%-sq. microns) | −41.2 |
| $\Delta_4$ (%) | 0.00 |
| $r_4$ (microns) | 62.5 |
| LP11 theoretical cutoff (microns) | 0.983 |
| MFD @ 1064 (microns) | 7.73 |
| MFD @ 1310 (microns) | 8.72 |
| Aeff at 1310 nm (sq. microns) | 60.20 |
| Pin array bend loss @ 1310 (dB) | 8.33 |
| Dispersion @ 1310 nm (ps/nm/km) | −1 |
| Slope @ 1310 nm (ps/nm$^2$/km) | 0.094 |
| Zero dispersion wavelength (nm) | 1320.6 |
| Cabled fiber cutoff (nm) | 955 |

The prototype fiber exhibits: a bend loss BL at 1310 nm of 0.25 dB/turn at a bend diameter of 10 mm (when bent around a 10 mm diameter mandrel), a bend loss BL of 0.13 dB/turn at a bend diameter of 15 mm (when bent around a 15 mm diameter mandrel), a bend loss BL of 0.066 dB/turn at a bend diameter of 20 mm (when bent around a 20 mm diameter mandrel), and a bend loss BL of 0.004 dB/turn at a bend diameter of 30 mm (when bent around a 30 mm diameter mandrel). The fiber also exhibits: a bend loss BL at 1550 nm of 2.43 dB/turn at a bend diameter of 10 mm, a bend loss BL of 1.12 dB/turn at a bend diameter of 15 mm, a bend loss BL of 1.02 dB/turn at a bend diameter of 20 mm, and a bend loss BL of 0.35 dB/turn at a bend diameter of 30 mm. The measured attenuation was 0.77 dB/km at a wavelength of 1060 nm, 0.325 dB/km at a wavelength of 1310 nm, and 0.206 dB/km at a wavelength of 1550 nm.

Figure 8:
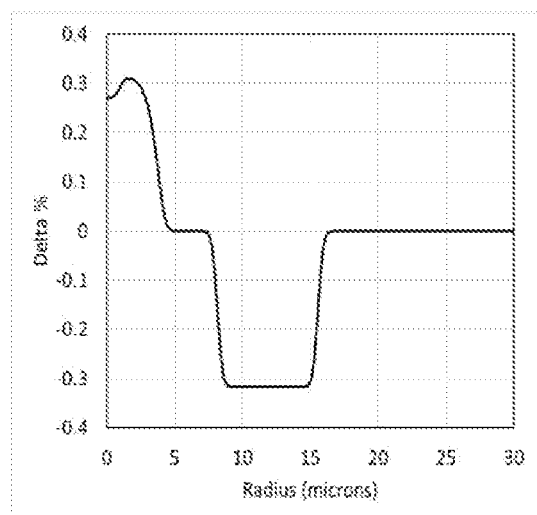
FIG. 8 is a refractive index profile for Example 28 from Table 5C as disclosed herein.
Figure 9:
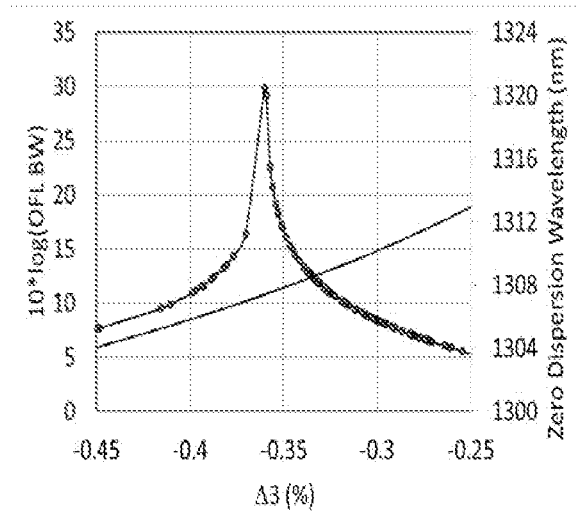
FIG. 9 depicts the sensitivity of the OFL BW and zero dispersion wavelength of Example 26 to variations in the trench depth.
Figure 10:
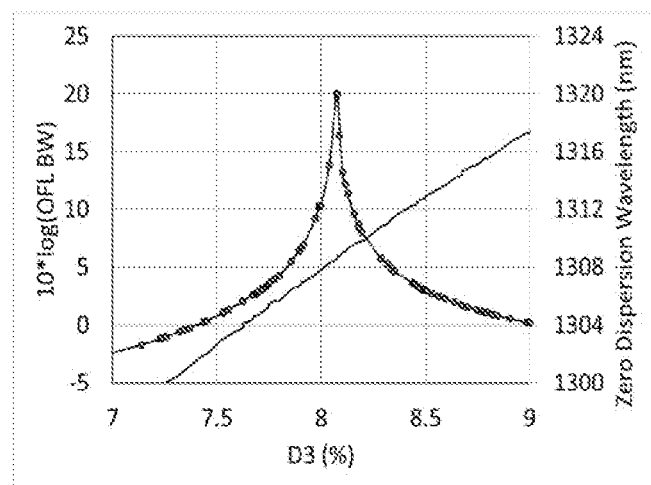
FIG. 10 depicts the sensitivity of the OFL BW and zero dispersion wavelength of Example 26 to variations in the inside radius of the trench.
Figure 11:
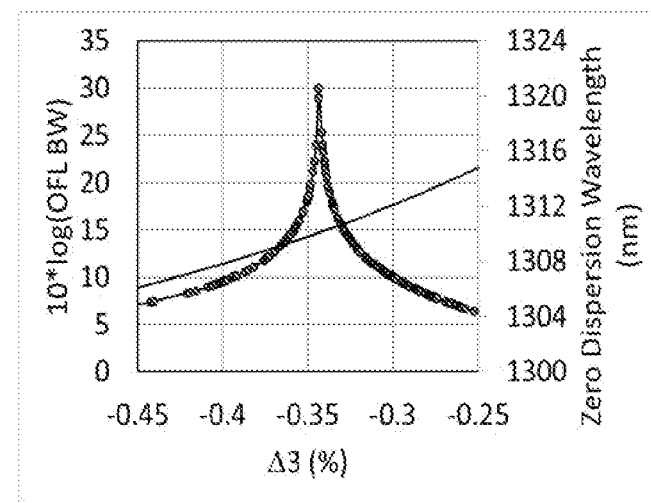
FIG. 11 depicts the sensitivity of the OFL BW and zero dispersion wavelength of Example 28 to variations in the trench depth.
Figure 12:
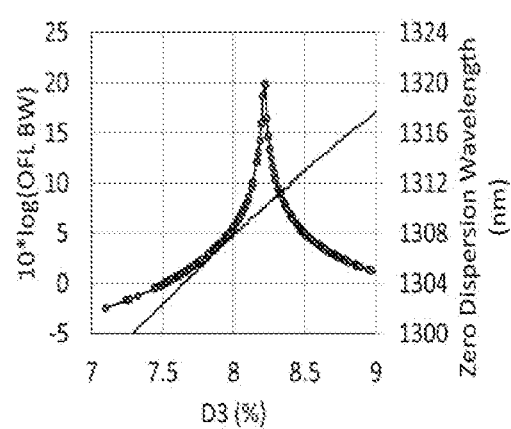
FIG. 12 depicts the sensitivity of the OFL BW and zero dispersion wavelength of Example 28 to variations in the inside radius of the trench.

FIG. 8 depicts a refractive index profile for Example 28 from Table 5C with a modest centerline dip. FIG. 9 depicts the sensitivity of the OFL BW and zero dispersion wavelength of Example 26 to variations in the trench depth. FIG. 10 depicts the sensitivity of the OFL BW and zero dispersion wavelength of Example 26 to variations in the inside radius of the trench. FIG. 11 depicts the sensitivity of the OFL BW and zero dispersion wavelength of Example 28 to variations in the trench depth. FIG. 12 depicts the sensitivity of the OFL BW and zero dispersion wavelength of Example 28 to variations in the inside radius of the trench.

Fabricating the Optical Fibers

Figure 4:
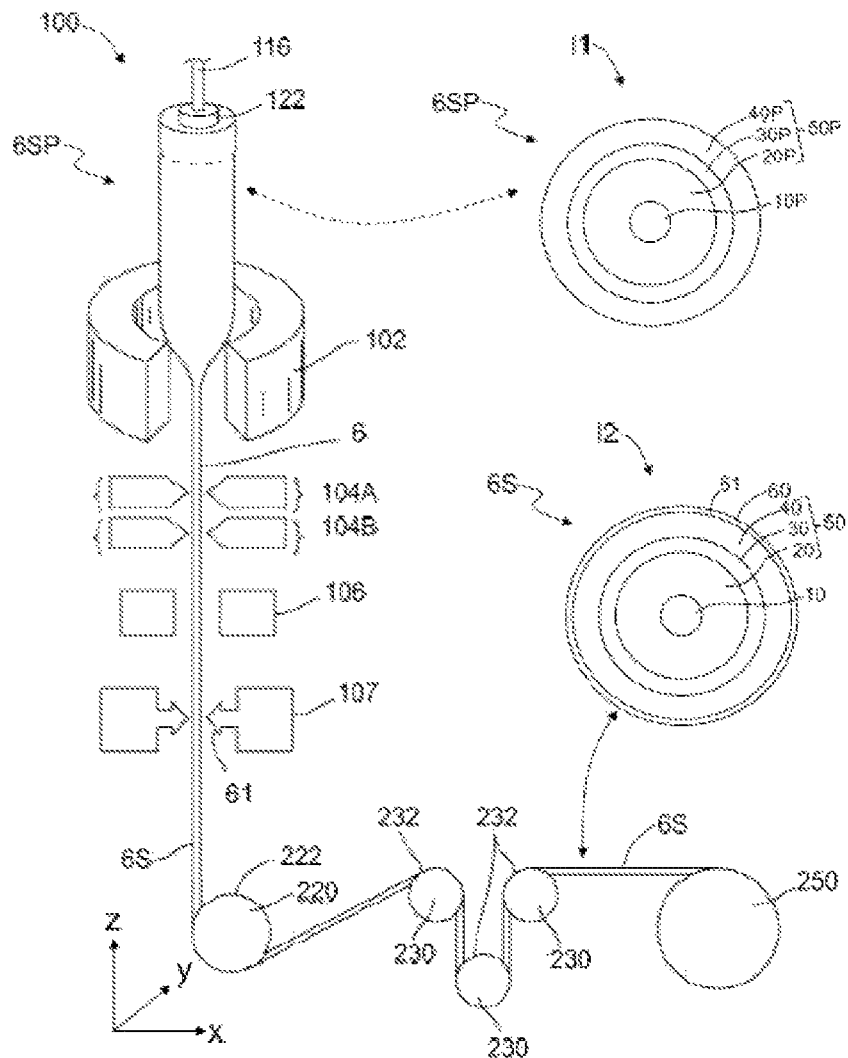
FIG. 4 is a schematic diagram of an example optical fiber drawing system illustrating the fabrication of single-core optical fiber as disclosed herein.

FIG. 4 is a schematic diagram of an example optical fiber drawing system ("drawing system") 100 for drawing a single-core glass preform 6SP into the single core fiber 6S. The single core fiber 6S can be fabricated using the drawing system 100 and fiber drawing techniques known in the art.

With reference to FIG. 4, the example drawing system 100 includes a draw furnace ("furnace") 102 for heating the preform 6SP to the glass melt temperature. In an example, the fiber draw process is carried out a glass melt temperature, which in an example is in the range from 1800° C. to 1900° C. A preform holder 116 is used to hold the preform 6SP.

The drawing system 100 also includes non-contact measurement sensors 104A and 104B for measuring the size of a drawn (bare) fiber 6S that exits the draw furnace 102 for size (diameter) control. A cooling station 106 resides downstream of the measurement sensors 104A and 104B and is configured to cool the bare single-core fiber 6S. A coating station 107 resides downstream of the cooling station 106 and is configured to deposit a protective coating material 61 onto the bare fiber 6S to form the protective coating 60. A tensioner 220 resides downstream of the coating station 107. The tensioner 220 has a surface 222 that pulls (draws) the coated single-core fiber 6S. A set of guide wheels 230 with respective surfaces 232 resides downstream of the tensioner 220. The guide wheels 230 serve to guide the coated single-core fiber 6S, to a fiber take-up spool ("spool") 250 for storage.

The close-up inset I1 of FIG. 4 shows a cross-sectional view of the single-core preform 6SP used to fabricate the single-core fiber 6S. The single core preform 6SP includes a preform core 10P, a preform inner cladding region 20P, a preform intermediate cladding region or preform trench 30P and a preform outer cladding 40P. The preform inner cladding region 20P, the preform trench 30P and the preform outer cladding region 40P constitute a preform cladding 50P. The preform 6SP can be fabricated using known techniques, such as an outside vapor deposition (OVD) process.

The close-up inset I2 shows a cross-sectional view of the coated single-core fiber 6S. In an example, the protective coating material 61 comprises a non-glass material, such as a polymer or acrylate.

Example Data Transmission Systems

Figure 5A:
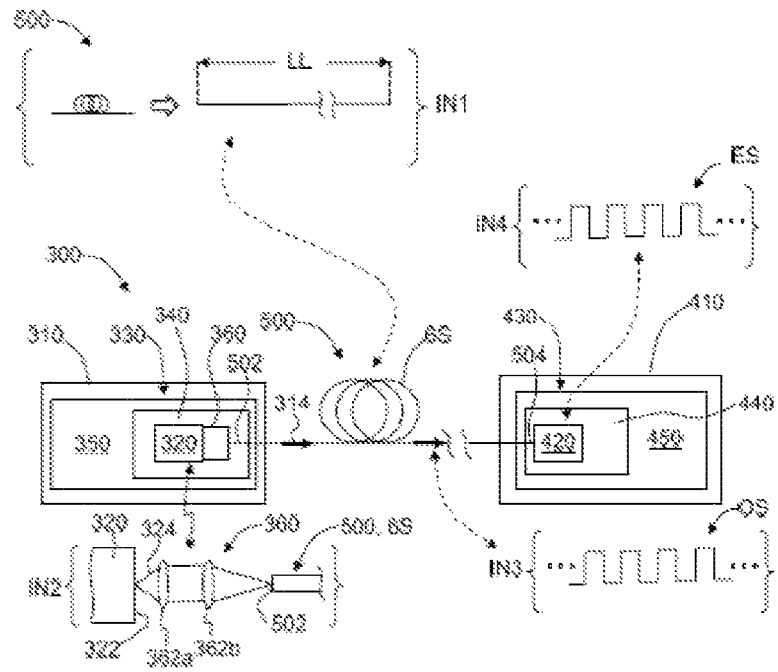
FIG. 5A is a schematic diagram of an example optical fiber data communications system as disclosed herein.

FIG. 5A is a schematic diagram of an example optical fiber data communications system ("system") 300 that comprises a transmitter 310 and a receiver 410 optically connected by an optical fiber link 500. The optical fiber link 500 comprises at least a section of the single core fiber 6S as disclosed herein. In an example, the optical fiber link 500 has an input end 502, an output end 504, and link length LL measured along the fiber(s) of the link between the input and output ends (see close-up inset IN1, which shows the optical fiber link 500 "unwound" to show the link length LL of the example systems disclosed herein). In an example, the link length is up to 1000 meters. In an example, the optical fiber link 500 can be constituted by a middle section constituted by a section of fiber 6S and input and output end sections constituted by relatively short jumper cables (e.g., a few meters long, at most). In an example, the jumper cables can also be made of the fiber 6S.

An example transmitter 310 includes a VCSEL 320 and a transmitter electronics unit 330 configured to operably support the operation of the VCSEL. In an example, the transmitter electronics unit 330 comprises a transmitter electronic integrated circuit (IC) 340 operably supported by a transmitter circuit board (e.g., a printed circuit board or PCB) 350. In an example, the transmitter electronic IC 340 is configured with a VCSEL driver and related electronic components (not shown) as known in the art.

With reference to the close-up inset IN2 of FIG. 5A, the VCSEL 320 has an output end 322 from which light 324 is emitted. In an example, the light 324 is optically coupled into the input end 502 of the optical link 500 (e.g., fiber 6S) using a coupling optical system 360. The example coupling optical system 360 comprises first and second lenses 362a and 362b, which in an example are aspherical lens elements. The close-up inset IN3 shows the light 324 comprising optical signals OS.

The receiver 410 comprises a photodetector 420 optically coupled to the output end 504 of the optical fiber link 500. The photodetector 420 is operably supported by a receiver electronics unit 430 configured to operably support the photodetector. In an example, the receiver electronics unit 430 comprises a receiver IC 440 operably supported by a receiver circuit board (e.g., a printed circuit board or PCB) 450. In an example, photodetector 420 is configured to convert the optical signals OS encoded on the light 324 into electrical signals ES (see the close-up inset IN4 in FIG. 5A), and the receiver IC 440 is configured to receive and process the electrical signals.

The system 300 is configured by virtue of the fiber 6S for SM optical transmission when the light 324 has a wavelength λ above 1260 nm and few mode optical transmission in the system 300 is compliant/compatible with the cutoff wavelength $\lambda_C$ and mode field diameter MFD of a standard SM fiber at 1310 nm and 1550 nm for SM operation and is optimized for bandwidth at a wavelength λ in the range from 850 nm to 1060 nm for few mode transmission with SM or few mode VCSELs 320.

Figure 5B:
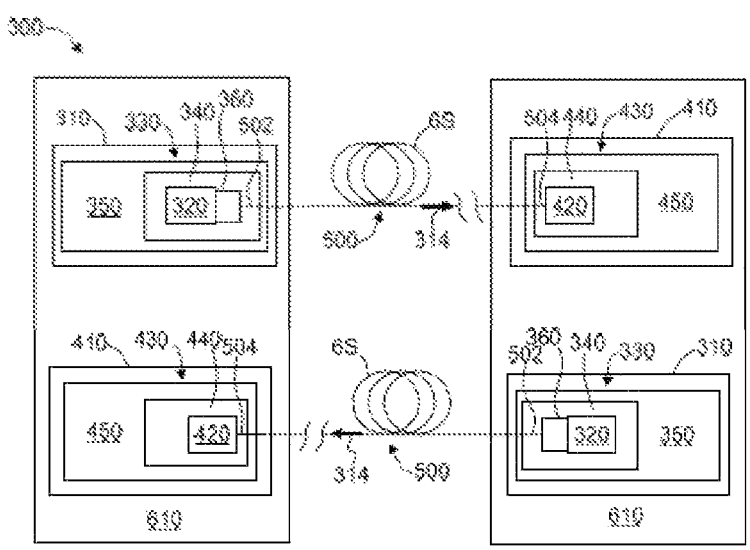
FIG. 5B is a schematic diagram of an example optical fiber data communications that includes two transceivers 610 in optical communication via two optical fiber links as disclosed herein.

FIG. 5B is similar to FIG. 5A and illustrates an example system 300 that includes two transceivers 610 in optical communication via two optical fiber links 500. Each transceiver 610 includes the transmitter 310 and the receiver 410. The system 300 provides two-way data communication between the optically coupled transceivers 610 via the two optical fiber links 500.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. An optical fiber, comprising:
   a) a core arranged along a centerline AC without a centerline dip and having a relative refractive index defined by an alpha parameter 3.5≤a≤15 with a maximum relative refractive index $\Delta_{1max}$ in the range 0.3%≤$\Delta_{1max}$≤0.5% and a radius $r_1$ in the range 4.6 µm≤$r_1$≤5.6 µm;
   b) a first inner cladding region immediately surrounding the core and having a relative refractive index $\Delta_2$ in the range −0.02%≤$\Delta_2$≤0.02% and a radius $r_2$ in the range from 10 µm≤$r_2$≤12 µm;
   c) a second inner cladding region immediately surrounding the first inner cladding region and having a relative refractive index $\Delta_3 \leq \Delta_2$ and in the range $-0.7\% \leq \Delta_3 \leq -0.1\%$ and a radius $r_3$ in the range from 10 m$\leq r_3 \leq$18 µm;

d) an outer cladding region immediately surrounding the second inner cladding region and having a relative refractive index $\Delta_4 \geq \Delta_3$ and in the range $0 \leq \Delta_4 \leq 0.04\%$ and a radius $r_4$ in the range from 40 µm$\leq r_4 \leq$62.5 µm; and i) a cable cutoff wavelength $\lambda_C$ of equal to or below 1260 nm thereby defining single mode operation at a wavelength in a first wavelength range greater than 1260 nm and few-mode operation at a wavelength in a second wavelength range from 970 nm and 1070 nm;

ii) a mode-field diameter MFD in the range from 9.3 µm$\leq$MFD$\leq$10.9 µm at 1550 nm; and iii) an overfilled bandwidth OFL BW of 1 GHz·km to 3 GHz·km at at least one wavelength in the second wavelength range.

2. The optical fiber according to claim 1, wherein the core has a relative refractive index defined by an alpha parameter $3.5 \leq a \leq 5.5$.

3. The optical fiber according to claim 1, wherein the maximum relative refractive index $\Delta_{1max}$ of the core is in the range $0.34\% \leq \Delta_{1max} \leq 0.37\%$.

4. The optical fiber according to claim 1, wherein the relative refractive index $\Delta_2$ is in the range $-0.002\% \leq \Delta_2 \leq 0.002\%$.

5. The optical fiber according to claim 1, wherein a mode field diameter MFD is in the range from 8.2 m$\leq$MFD$\leq$9.7 µm at 1310 nm.

6. The optical fiber according to claim 1, wherein a zero-dispersion wavelength $\lambda_0$ is in the range from $1300 \leq \lambda_0 \leq 1324$.

7. The optical fiber according to claim 1, wherein a dispersion at 1550 nm is in the range from 16.5 ps/nm·km to 18 ps/nm·km.

* * * * *